(12) United States Patent
Dou et al.

(10) Patent No.: US 9,794,242 B2
(45) Date of Patent: Oct. 17, 2017

(54) METHOD, APPARATUS AND APPLICATION PLATFORM FOR REALIZING LOGON TO AN APPLICATION SERVICE WEBSITE

(71) Applicant: TENCENT TECHNOLOGY (SHENZHEN) COMPANY LIMITED, Shenzhen (CN)

(72) Inventors: Ningjun Dou, Shenzhen (CN); Jie Lin, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 131 days.

(21) Appl. No.: 14/744,070

(22) Filed: Jun. 19, 2015

(65) Prior Publication Data

US 2015/0288673 A1    Oct. 8, 2015

Related U.S. Application Data (63) Continuation of application No. PCT/CN2013/090385, filed on Dec. 25, 2013.

(30) Foreign Application Priority Data

Dec. 27, 2012    (CN) .......................... 2012 1 0579372

(51) Int. Cl.
*G06F 7/04*          (2006.01)
*G06F 15/16*         (2006.01)
(Continued)

(52) U.S. Cl.
CPC ............ *H04L 63/08* (2013.01); *H04L 63/083* (2013.01); *H04L 63/0815* (2013.01);
(Continued)

(58) Field of Classification Search
CPC . G06F 21/51; G06F 21/41; G06F 7/04; G06F 15/16; G06F 17/30; H04L 63/0815; H04L 63/0884; H04L 29/06
See application file for complete search history.

(56) References Cited

U.S. PATENT DOCUMENTS 6,115,040 A * 9/2000 Bladow ............... G06F 11/0709
                                                707/E17.107
7,103,666 B2 * 9/2006 Royer ..................... G06F 21/41
                                                      709/200
(Continued)

FOREIGN PATENT DOCUMENTS

CN       1763773 A      4/2006
CN     101350797 A      1/2009
(Continued)

OTHER PUBLICATIONS

Search Report in International Application No. PCT/CN2013/090385 dated Mar. 27, 2014.
(Continued)

*Primary Examiner* — Jayesh Jhaveri
(74) *Attorney, Agent, or Firm* — Marshall, Gerstein & Borun LLP (57) ABSTRACT

The present disclosure provides a method for realizing logon to an application service website on an operation platform, including when a user terminal visits the application service website, receiving a first URL request sent from the application service website; obtaining logon information of an account of the application service website from the local according to the first URL request; and returning the logon information of the account to the application service website by invoking a first predefined function containing the logon information of the account, so that the application service website provides a web page for the user terminal to fast log on. The present disclosure also provides an apparatus for
(Continued)

realizing logon to an application service website on an operation platform and an operation service platform.

15 Claims, 6 Drawing Sheets

(51) Int. Cl.
 G06F 17/30 (2006.01)
 H04L 29/06 (2006.01)
 H04L 29/08 (2006.01)
 G06F 21/51 (2013.01)
 G06F 21/41 (2013.01)

(52) U.S. Cl.
 CPC .............. *H04L 67/02* (2013.01); *H04L 67/20* (2013.01); *G06F 21/41* (2013.01); *G06F 21/51* (2013.01); *H04L 63/0884* (2013.01)

(56) References Cited

U.S. PATENT DOCUMENTS

| | | | | |
|---|---|---|---|---|
| 8,108,490 | B2* | 1/2012 | Guo | G06F 17/30873 709/203 |
| 8,954,004 | B1* | 2/2015 | Wang | G06F 21/41 455/41.1 |
| 2004/0117493 | A1* | 6/2004 | Bazot | G06F 21/41 709/229 |
| 2005/0149761 | A1* | 7/2005 | Chiviendacz | B42D 25/351 726/19 |
| 2010/0082979 | A1* | 4/2010 | Edwards | H04L 63/0428 713/168 |
| 2011/0321139 | A1 | 12/2011 | Jayaraman et al. | |

FOREIGN PATENT DOCUMENTS

| | | |
|---|---|---|
| CN | 101588315 A | 11/2009 |
| CN | 102065141 A | 5/2011 |
| CN | 102346823 A | 2/2012 |
| CN | 102571857 A | 7/2012 |
| CN | 102664926 A | 9/2012 |
| CN | 102752230 A | 10/2012 |
| CN | 102821085 A | 12/2012 |
| CN | 102833328 A | 12/2012 |

OTHER PUBLICATIONS

Office Action in CN Application No. 201210579372.5 dated Jun. 1, 2017, six pages.
English translation of International Preliminary Report on Patentability and Written Opinion in International Application No. PCT/CN2013/090385 dated Jun. 30, 2015, six pages.

* cited by examiner

METHOD, APPARATUS AND APPLICATION PLATFORM FOR REALIZING LOGON TO AN APPLICATION SERVICE WEBSITE

CROSS REFERENCE TO RELATED APPLICATIONS

This application is a continuation of International Application No. PCT/CN2013/090385, filed on Dec. 25, 2013. This application claims the benefit and priority of Chinese Patent Application No. 201210579372.5, filed on Dec. 27, 2012. The entire disclosures of each of the above applications are incorporated herein by reference.

TECHNICAL FIELD

The present disclosure relates to internet technologies, and especially to a method, apparatus and operation application platform for realizing logon to an application service website.

BACKGROUND

Currently, fast logon to a third party application service website can be realized on a PC. Take the QQ application as an example. After a user logs on to the QQ, if the user further needs to access a QQ mailbox, there will be words "fast logon" shown on an interface of a browser on the PC, and the user needs not to input his account information again, and the browser will extract identity data of the user from the operation system so as to realize the fast logon according to an operation of the user clicking a fast logon button.

However, traditional fast logon solutions realized on a PC are not applicable to the IOS operation platform, and in the IOS operation platform, after a user visits a certain service website, when he visits the service website again or visits a relevant website, he needs to input the account information again to log on, which causes inconvenience to the user and is unable to meet high efficient operation requirements of the user.

SUMMARY

The present disclosure provides a method, apparatus and application platform for realizing logon to an application service website, so as to realize the fast logon to the application service website, improving the user's operation efficiency.

In an aspect, the present disclosure provides a method for realizing logon to an application service website on an operation application platform, which includes: when the application service website is visited, receiving a first URL request sent from the application service website; obtaining logon information of an account of the application service website from the local according to the first URL request; and returning the logon information of the account to the application service website by invoking a first predefined function containing the logon information of the account, so that the application service website provides a web page for fast logon.

In another aspect, the present disclosure discloses an apparatus for realizing logon to an application service website on an operation platform, which includes: memory; one or more processors; and one or more programs stored in the memory and configured for execution by the one or more processors, the one or more programs including instructions to: when the application service website is visited, receive a first URL request sent from the application service website; obtain logon information of an account of the application service website from the local according to the first URL request; and return the logon information of the account to the application service website by invoking a first predefined function containing the logon information of the account, so that the application service website provides a web page for fast logon.

The present disclosure also provides an operation application platform for realizing logon to an application service website on an operation platform, which includes the above apparatus.

According to the method, apparatus, and operation application platform for realizing logon to an application service website on an operation platform provided by the present disclosure, when the user terminal visits the application service website, the operation application platform receives the first URL request sent from the application service website; obtains logon information of the account of the application service website from the local according to the first URL request; and returns the logon information of the account to the application service website by invoking a first predefined function containing the logon information of the account, so that the application service website provides a fast logon web page for the user terminal to fast log on. In such a way, fast logon to the application service website is realized and the user's operation efficiency is improved.

BRIEF DESCRIPTION OF THE DRAWINGS

For a better understanding of the present disclosure, reference should be made to the Detailed Description below, in conjunction with the following drawings in which like reference numerals refer to corresponding parts throughout the figures.

DETAILED DESCRIPTION

Reference will now be made in detail to examples, which are illustrated in the accompanying drawings. In the following detailed description, numerous specific details are set forth in order to provide a thorough understanding of the present disclosure. Also, the figures are illustrations of an example, in which modules or procedures shown in the figures are not necessarily essential for implementing the present disclosure. In other instances, well-known methods, procedures, components, and circuits have not been described in detail so as not to unnecessarily obscure aspects of the examples.

A solution of the present disclosure is that, when a user terminal visits a third party application service website, an operation application platform receives a first URL request sent from the third party application service website; obtains logon information of an account of the third party application service website from the local according to the first URL request; returns the logon information of the account to the third party application service website by invoking a first predefined function containing the logon information of the account, and the third party application service website provides a fast logon web page according to the obtained logon information of the account for the user terminal to fast log on, so as to avoid inconvenience of inputting the account information again, thus improving the user operation efficiency.

Figure 1:
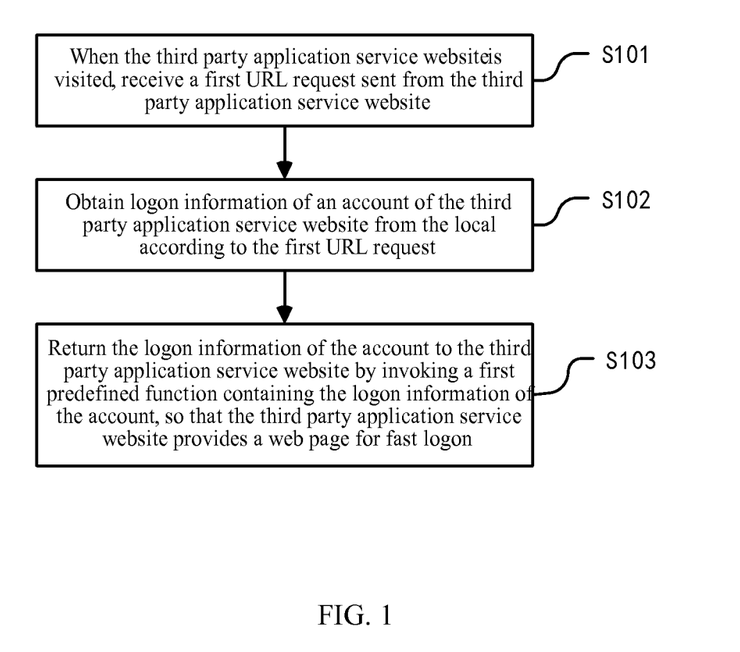
FIG. 1 shows a schematic diagram of a flow of a method for realizing logon to a third party application service website on an operation application platform according to a first example of the present disclosure.

FIG. 1 shows a method for realizing logon to a third party application service website on an operation application platform according to a first example of the present disclosure. The method includes the following process.

At block S101, when a user terminal visits the third party application service website, the operation application platform receives a first URL request sent from the third party application service website.

In the present example, the operation application platform refers to a certain application platform running on an operation system. The operation system can be but is not limited to the IOS operation system, and the application platform can be a browser, a network community such as Weibo or QQ zone, or other applications. Take the IOS operation system as an example. The application platform of it can be the webkit browser and the third party application service website can be a service website relevant to an authentication center (i.e., an account center) designed at the webkit browser locally. That is to say, after the user terminal logs on in the authentication center, it can use logon information of an account in the authentication center to fast log on to the relevant service website (referred to as relevant service website hereafter), e.g., relevant service websites such as QQ, Weibo, etc.

The present example takes realizing the fast logon to the relevant service website in the webkit browser of the IOS operation system as the example. The detailed implementation is as follows. In the webkit browser of the IOS operation system, when a user visits a certain service website, logon information of an account in the account center of the browser is obtained locally, and a prompt is used to prompt the user whether he is going to use the account to "fast log on", so as to avoid problems caused by inputting the account information again, realizing an effect similar to fast logon to the QQ service on a PC.

Specifically, in the webkit browser of the IOS operation system (referred to as the browser hereafter), when the user terminal logs on to the relevant service website, it needs to first log on to the authentication center designed locally at the browser.

The user terminal is authenticated by the local authentication center, and after the authentication is passed, the browser obtains the logon information of the account that the user terminal uses to log on to the relevant service website and saves it locally.

When the user terminal visits the above relevant service website, the browser receives the first URL request sent from the relevant service website. The first URL request is used to inquire whether the authentication center of the browser has the logon information of the account and the detailed format thereof can be set to be that the URL contains words "mtt:login:getUinAndSidInfo".

At block 102, the logon information of the account of the third party application service website is obtained from the local according to the first URL request.

At block 103, the logon information of the account is returned to the third party application service website by invoking the first predefined function containing the logon information of the account, and the fast logon web page is provided by the third party application service website for the user terminal to fast log on.

When the browser detects the first URL request, it runs the first predefined function negotiated with the relevant website in advance. Specifically the first predefined function can be a js function. Meanwhile, the logon information of the account in the authentication center stored by the browser is used as a parameter of the js function.

When the relevant service website executes the js function, it uses the parameter passed by the js function as the logon information of the account stored in the authentication center.

Figure 2:
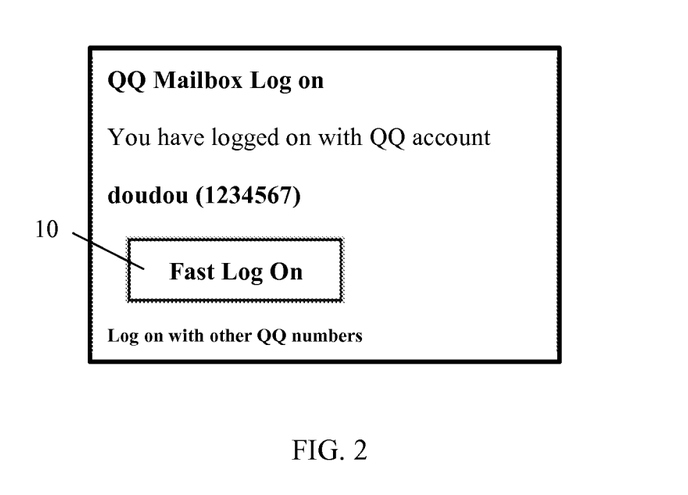
FIG. 2 shows a schematic diagram of a fast logon web page in the method for realizing logon to a third party application service website on an operation application platform according to the first example of the present disclosure.

When the relevant service website obtains the logon information of the account via the above steps, it displays a fast logon web page similar to that shown in FIG. 2 to inquire whether the user uses the logon account in the authentication center to fast log on to the website without needing to input the account information again.

When the user clicks the fast logon button 10, he can enter into the relevant service website and visit corresponding services so as to realize the fast visit to the relevant service website. Since the user needs not to input the account information again, thus the method significantly improves the user's operation efficiency.

Figure 3:
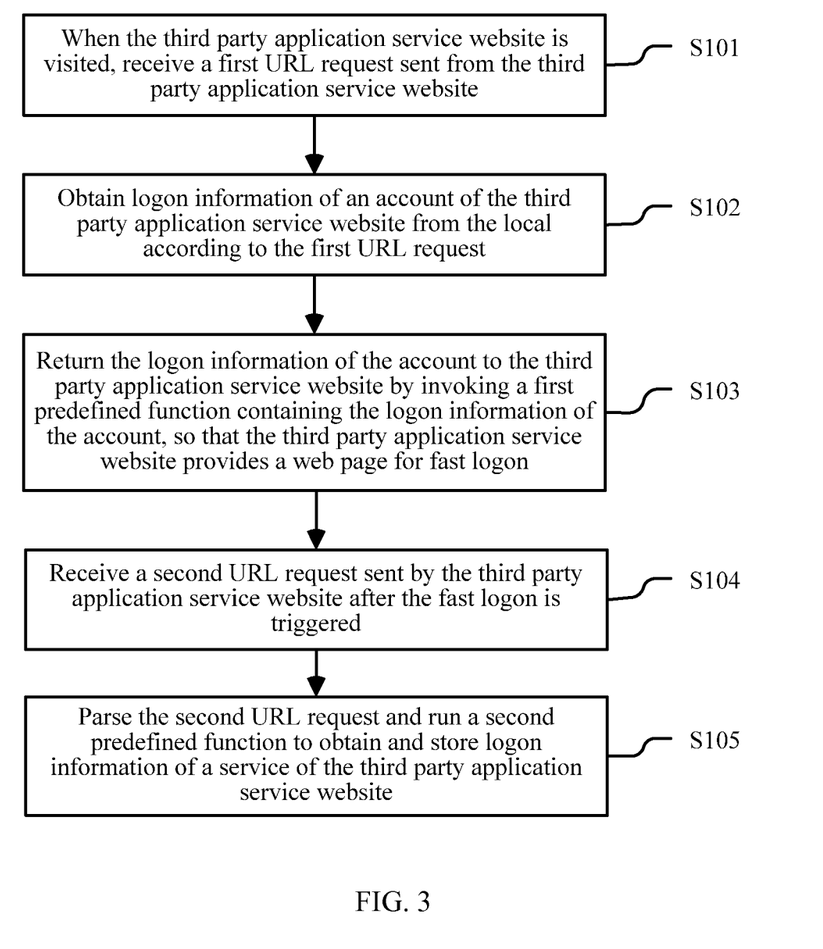
FIG. 3 shows a schematic diagram of a flow of a method for realizing logon to a third party application service website on an operation application platform according to a second example of the present disclosure.

FIG. 3 shows a method for realizing logon to a third party application service website on an operation platform according to a second example of the present disclosure. Based on the first example, after the block S103, it further includes the following steps.

At block S104, a second URL request sent by the third party application service website after the user terminal triggers the fast logon is received.

At block S105, the second URL request is parsed and a second predefined function is run to obtain and store the logon information of the service of the third party application service website.

The differences between the present example and the above first example are that, in the present example, after the user terminal triggers the fast logon, via interaction between the relevant service website and the browser, the browser can obtain the service logon information of the user terminal logging on to the relevant service website this time and store it locally so as to when the user terminal logs on to the relevant service website or other relevant websites again, he can directly enter into the corresponding service website, which further improves the efficiency of the user operation.

Specifically, when the user clicks the fast logon button, the relevant service website will send the second URL request to the browser. The second URL request can use a format containing the words "mtt:login:setQCookie" to inform the browser of the operation behavior of the user.

After the browser detects the second URL request, it runs the second predefined function negotiated with the relevant service website in advance, obtains the service logon information and stores it. The service logon information is generally represented by cookie and the above second predefined function can also use the js function.

By the above operation, when the user terminal logs on to the relevant service website again or other relevant service websites, he can enter into the corresponding service websites directly, which further improves the efficiency of the user operation.

Figure 4:
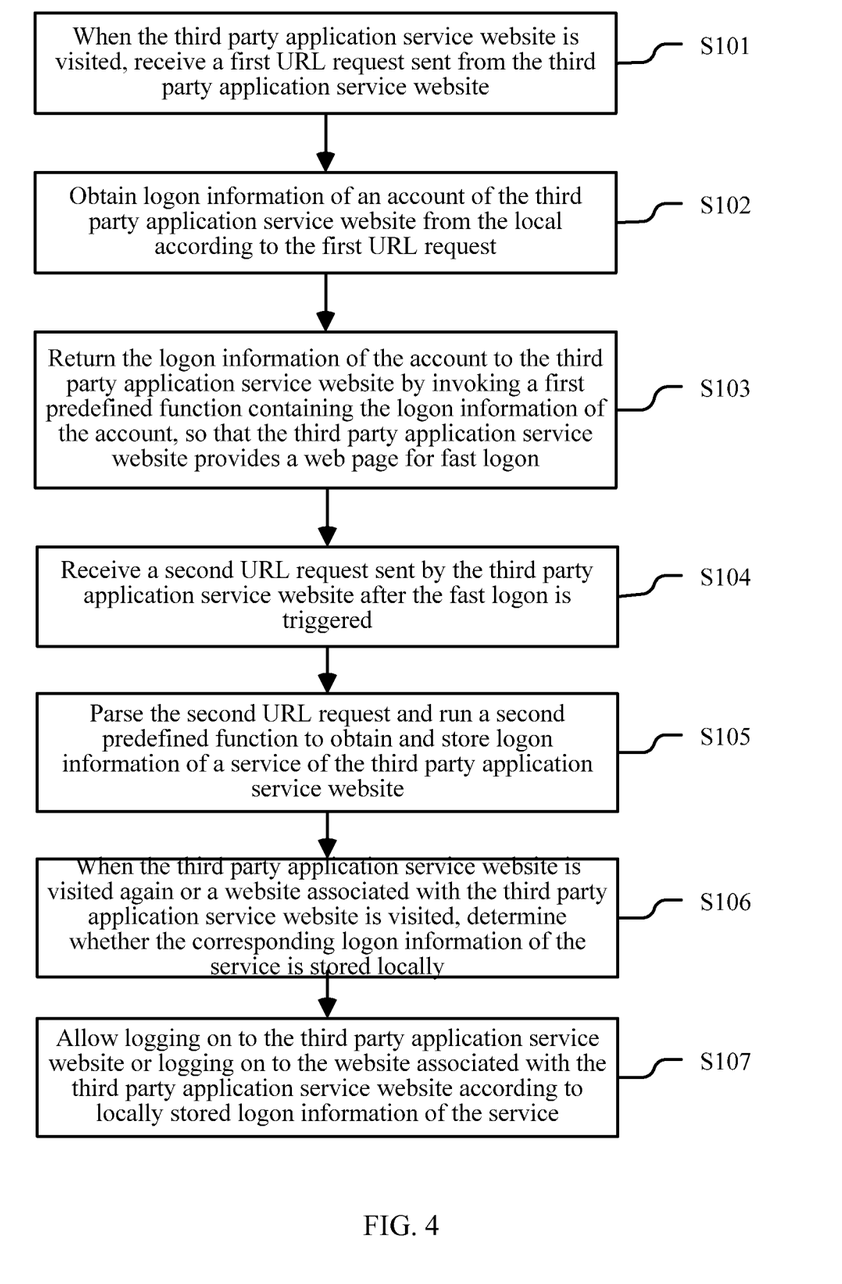
FIG. 4 shows a schematic diagram of a flow of a method for realizing logon to a third party application service website on an operation application platform according to a third example of the present disclosure.

FIG. 4 shows a method for realizing logon to a third party application service website on an operation platform according to a third example of the present disclosure. Based on the above second example, after the block S105, it further includes the following.

At block S106, when the user terminal visits the third party application service website again or visits a website associated to the third party application service website, the operation application platform determines whether corresponding service logon information is stored locally; and if it is, then block S107 is entered.

At block S107, the user terminal is allowed to log on to the third party application service website or the associated website of the third party application service website.

The differences between the present example and the above second example are that, in the present example, after the user terminal triggers the fast logon, via the interaction between the relevant service website and the browser, after the browser obtains the service logon information used when the user terminal logs on to the relevant service website, when the user terminal visits the relevant service website it logged on before or a website associated to the relevant service website, it can automatically log on by carrying the identity.

Specifically, when the user terminal visits the relevant service website it logged on before again or visits the associated website of the relevant service website, the browser will determine whether the corresponding service logon information is stored locally; and if it is, then the user terminal needs not to perform the identity authentication in the authentication center, and there is no need to provide the fast logon interface for the user to confirm, however, the user terminal is allowed to log on to the relevant service website or the website associated to the relevant service website directly. The associated website of the relevant service website refers to main domain names or sub-domain names that belong to a same domain name system with the relevant service website. For example, there are multiple relevant sub-domain names under the main domain name qq.com: mail.qq.com or t.qq.com, etc., and the above qq.com, mail.qq.com and t.qq.com use same service logon information. When the user uses the method of the present example to store the service logon information of qq.com, he can use the service logon information to log on other associated relevant websites, which saves the problem of inputting the account password again, saving the user logon time and improving the operation efficiency.

Figure 5:
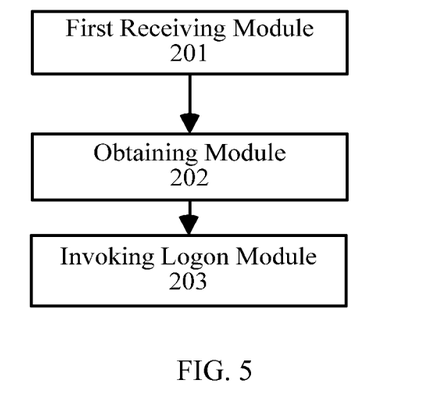
FIG. 5 shows a structural schematic diagram of an apparatus for realizing logon to a third party application service website on an operation application platform according to a first example of the present disclosure.

FIG. 5 shows an apparatus for realizing logon to a third party application service website on an operation platform according to a first example of the present disclosure. The apparatus includes: a first receiving module 201, an obtaining module 202 and an invoking logon module 203.

The first receiving module 201 is configured to, when a user terminal visits the third party application service website, receive a first URL request sent from the third party application service website.

The obtaining module 202 is configured to obtain logon information of an account of the third party application service website from the local according to the first URL request.

The invoking logon module 203 is configured to return the logon information of the account to the third party application service website by invoking a first predefined function containing the logon information of the account, so that the third party application service website provides a fast logon web page for the user terminal to fast log on.

In the present example, the operation application platform refers to a certain application platform running on an operation system. The operation system can be but is not limited to the IOS operation system, and the application platform can be a browser, a network community such as Weibo or QQ zone, or other applications. Take the IOS operation system as an example. The application platform of it can be the webkit browser and the third party application service website can be a service website relevant to an authentication center (i.e., an account center) designed at the webkit browser locally. That is to say, after the user terminal logs on in the authentication center, it can use logon information of an account in the authentication center to fast log on to the relevant service website (referred to as relevant service website hereafter), e.g., relevant service websites such as QQ, Weibo, etc.

The present example takes realizing the fast logon to the relevant service website in the webkit browser of the IOS operation system as the example. The detailed implementation is as follows. In the webkit browser of the IOS operation system, when a user visits a certain service website, logon information of an account in the account center of the browser is obtained locally, and a prompt is used to prompt the user whether he is going to use the account to "fast log on", so as to avoid problems caused by inputting the account information again, realizing an effect similar to fast logon to the QQ service on a PC.

Specifically, in the webkit browser of the IOS operation system (referred to as the browser hereafter), when the user terminal logs on to the relevant service website, it needs to first log on to the authentication center designed locally at the browser.

The user terminal is authenticated by the local authentication center, and after the authentication is passed, the browser obtains the logon information of the account that the user terminal uses to log on to the relevant service website and saves it locally.

When the user terminal visits the above relevant service website, the browser receives the first URL request sent from the relevant service website by using the first receiving module 201. The first URL request is used to inquire whether the authentication center of the browser has the logon information of the account and the detailed format thereof can be set to be that the URL contains words "mtt:login:getUinAndSidInfo".

After the browser detects the first URL request, it obtains the logon information of the account of the relevant service website from the local according to the first URL request by using the obtaining module 202. The invoking logon module 203 runs a first predefined function negotiated with the relevant website. Specifically, the first predefined function can use the js function, and meanwhile, the logon information of the account of the authentication center stored by the browser locally can be used as the parameter of the js function.

When the relevant service website executes the above js function, it uses the parameter passed by the js function as the logon information of the account stored in the authentication center.

When the relevant service website obtains the logon information of the account via the above steps, it displays a fast logon web page similar to that shown in FIG. 2 to inquire whether the user uses the account of the authentication center to fast log on to the website without needing to input the account information again.

When the user clicks the fast logon button 10, he can enter into the relevant service website and visit corresponding services so as to realize the fast visit to the relevant service website. Since the user needs not to input the account information again, thus the method significantly improves the user's operation efficiency.

Figure 6:
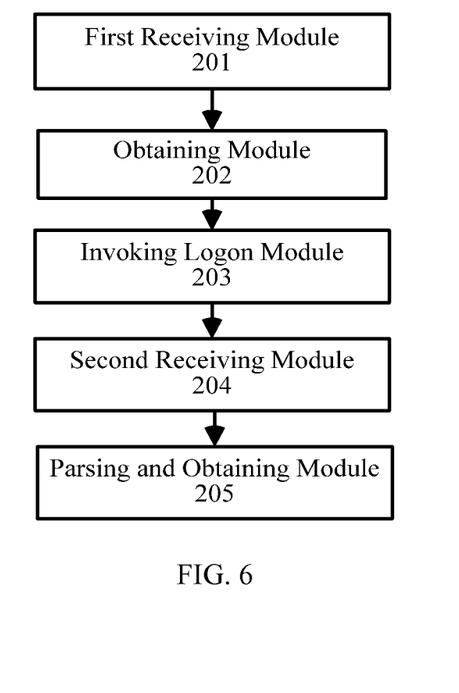
FIG. 6 shows a structural schematic diagram of an apparatus for realizing logon to a third party application service website on an operation application platform according to a second example of the present disclosure.

FIG. 6 shows an apparatus for realizing logon to a third party application service website on an operation platform according to a second example of the present disclosure. Based on the first example, the apparatus further includes a second receiving module 204 and a parsing and obtaining module 205.

The second receiving module 204 is configured to receive a second URL request sent by the third party application service website after the user terminal triggers the fast logon.

The parsing and obtaining module 205 is configured to parse the second URL request, run a second predefined function, and obtain and store the logon information of the service of the third party application service website.

The differences between the present example and the above first example are that, in the present example, after the user terminal triggers the fast logon, via interaction between the relevant service website and the browser, the browser can obtain the service logon information of the user terminal logging on to the relevant service website this time and store it locally so as to when the user terminal logs on to the relevant service website or other relevant websites again, he can directly enter into the corresponding service website, which further improves the efficiency of the user operation.

Specifically, when the user clicks the fast logon button, the relevant service website will send the second URL request to the browser. The second URL request can use a format containing the words "mtt:login:setQCookie" to inform the browser of the operation behavior of the user.

After the browser detects the second URL request, it runs the second predefined function negotiated with the relevant service website in advance, obtains the service logon information and stores it. The service logon information is generally represented by cookie and the above second predefined function can also use the js function.

By the above operation, when the user terminal logs on to the relevant service website again or other relevant service websites, he can enter into the corresponding service websites directly, which further improves the efficiency of the user operation.

Figure 7:
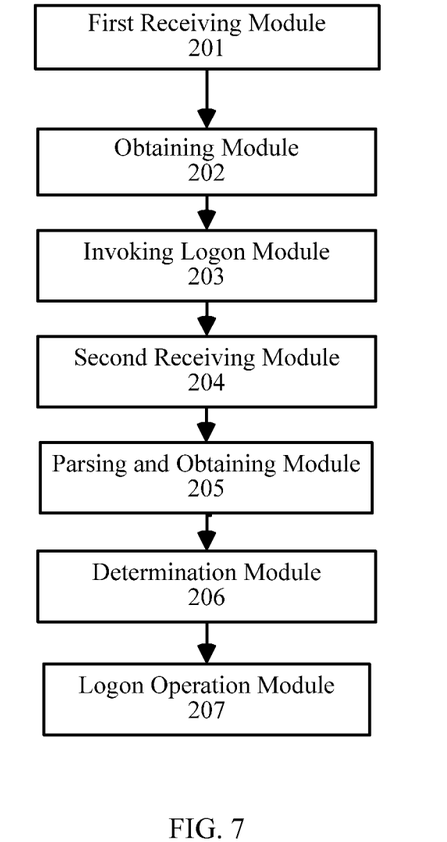
FIG. 7 shows a structural schematic diagram of an apparatus for realizing logon to a third party application service website on an operation application platform according to a third example of the present disclosure.

FIG. 7 shows an apparatus for realizing logon to a third party application service website on an operation platform according to a third example of the present disclosure. Based on the second example, the apparatus further includes a determination module 206 and a logon operation module 207.

The determination module 206 is configured to, when the user terminal visits the third party application service website again or visits a website associated to the third party application service website, the operation application platform determines whether corresponding service logon information is stored locally.

The logon operation module 207 is configured to, when the corresponding service logon information is stored locally, allow the user terminal to log on to the third party application service website or the associated website of the third party application service website.

The differences between the present example and the above second example are that, in the present example, after the user terminal triggers the fast logon, via interaction between the relevant service website and the browser, after the browser obtains the service logon information used when the user terminal logs on to the relevant service website, when the user terminal visits the relevant service website it logged on before or a website associated to the relevant service website, it can automatically log on by carrying the identity.

Specifically, when the user terminal visits the relevant service website it logged on before again or visits the associated website of the relevant service website, the browser will determine whether the corresponding service logon information is stored locally; and if it is, then the user terminal needs not to perform the identity authentication in the authentication center, and there is no need to provide the fast logon interface for the user to confirm, however, the user terminal is allowed to log on to the relevant service website or the website associated to the relevant service website directly. The associated website of the relevant service website refers to main domain names or sub-domain names that belong to a same domain name system with the relevant service website. For example, there are multiple relevant sub-domain names under the main domain name qq.com: mail.qq.com or t.qq.com, etc., and the above qq.com, mail.qq.com and t.qq.com use same service logon information. When the user uses the method of the present example to store the service logon information of qq.com, he can use the service logon information to log on other associated relevant websites, which saves the problem of inputting the account password again, saving the user logon time and improving the operation efficiency.

Figure 8:
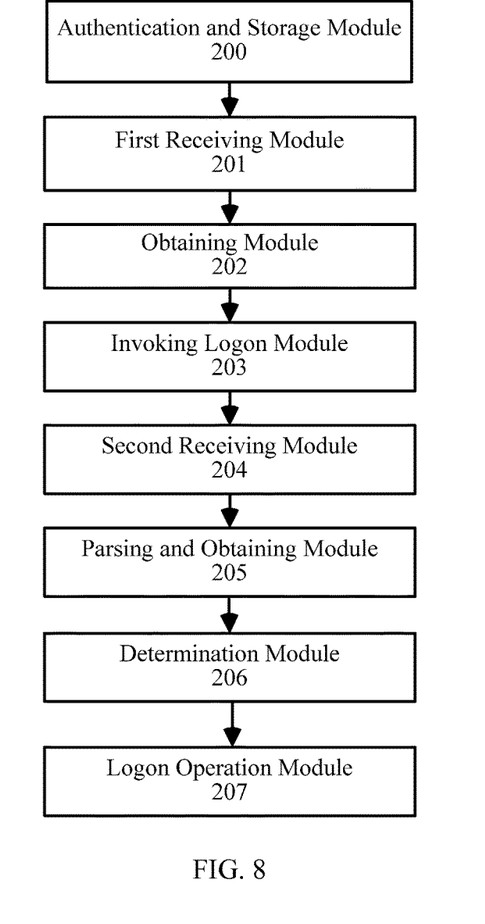
FIG. 8 shows a structural schematic diagram of an apparatus for realizing logon to a third party application service website on an operation application platform according to a fourth example of the present disclosure.

FIG. 8 shows an apparatus for realizing logon to a third party application service website on an operation application platform according to a fourth example of the present disclosure. Based on the third example, it further includes an authentication and storage module 200, configured to perform authentication for the user terminal by the local authentication center, and after the authentication is passed, obtain and store the logon information of the account of the third party application service website.

The differences between the present example and the above third example are that, in the current example, the logon information of the account of the relevant service website is stored temporally after the user logs on to the authentication center of the browser.

Specifically, take realizing the fast logon to the relevant service website in the webkit browser of the IOS operation system as the example.

In the webkit browser of the IOS operation system (referred to as the browser hereafter), when a user terminal logs on to the relevant service website, it needs to first log on to the authentication center designed locally at the browser.

When the authentication for the user terminal performed by the local authentication center is passed, the browser obtains the logon information of the account when the user terminal logs on to the relevant service website, and stores it locally, so that when subsequently the user terminal visits the above relevant service website, the browser obtains the logon information of the account from the local according to the URL request sent by the relevant service website, and returns the fast logon web page to the relevant service website for the user terminal to fast log on.

Figure 9:
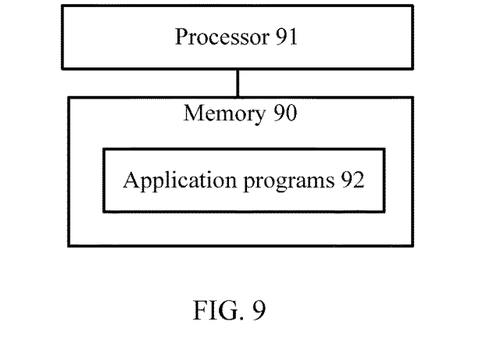
FIG. 9 shows a schematic diagram of an apparatus for realizing logon to a third party application service website on an operation application platform.

As shown in FIG. 9, the present disclosure also provides an apparatus for realizing logon to a third party application service website on an operation application platform. The apparatus includes memory 90, one or more processors 91, and one or more programs 92 stored in the memory and configured for execution by the one or more processors 91. The one or more programs 92 include instructions to execute the operations of blocks 101 to 107.

An example of the present disclosure also discloses a non-transitory computer-readable storage medium including a set of instructions for loading an attachment. The set of instructions are used to direct at least one processor to perform acts in the blocks 101 to 107.

Furthermore, an example of the present disclosure also provides an operation application platform for realizing logon to a third party application service website, which includes the apparatus provided in the above examples, and will not be elaborated.

According to the method, apparatus, and operation application platform for realizing logon to a third party application service website on an operation platform provided by the present disclosure, when the user terminal visits the third party application service website, the operation application platform receives the first URL request sent from the third party application service website; obtains logon information of the account of the third party application service website from the local according to the first URL request; and returns the logon information of the account to the third party application service website by invoking the first predefined function containing the logon information of the account, so that the third party application service website provides a fast logon web page for the user terminal to fast log on. In such a way, fast logon to the third party application service website is realized and the user's operation efficiency is improved.

The foregoing description, for purpose of explanation, has been described with reference to specific examples. However, the illustrative discussions above are not intended to be exhaustive or to limit the present disclosure to the precise forms disclosed. Many modifications and variations are possible in view of the above teachings. The examples were chosen and described in order to best explain the principles of the present disclosure and its practical applications, to thereby enable others skilled in the art to best utilize the present disclosure and various examples with various modifications as are suited to the particular use contemplated.

The above examples may be implemented by hardware, software, firmware, or a combination thereof. For example the various methods, processes and functional modules described herein may be implemented by a processor (the term processor is to be interpreted broadly to include a CPU, processing unit/module, ASIC, logic module, or programmable gate array, etc.). The processes, methods and functional modules may all be performed by a single processor or split between several processors; reference in this disclosure or the claims to a 'processor' should thus be interpreted to mean 'one or more processors'. The processes, methods and functional modules are implemented as machine readable instructions executable by one or more processors, hardware logic circuitry of the one or more processors or a combination thereof. The modules, if mentioned in the aforesaid examples, may be combined into one module or further divided into a plurality of sub-modules. Further, the examples disclosed herein may be implemented in the form of a software product. The computer software product is stored in a non-transitory storage medium and comprises a plurality of instructions for making an electronic device implement the method recited in the examples of the present disclosure.

What is claimed is:

1. A method for realizing logon to an application service website, performed by an operation application platform which runs on an operating system of a user terminal, the method comprising:

sending a request to visit the application service website;

in response to the request, receiving a first URL request sent from the application service website, which inquires whether there is logon information in the operation application platform, wherein the logon information is required to log on to the application service website;

obtaining the logon information of an account of the application service website locally from the user terminal, in response to determining that the logon information of the account of the application service website is stored locally on the user terminal;

returning the logon information of the account to the application service website by invoking a first predefined function and transmitting the logon information of the account as a parameter of the first predefined function to the application service website; and receiving, in response to the transmission of the logon information, a web page for fast logon to the application service website from the application service website, the web page comprising an object for triggering the fast logon, and wherein the fast logon is performed without inputting the logon information.

2. The method according to claim 1, further comprising:

receiving a second URL request sent by the application service website after a fast logon operation is triggered on the web page; and parsing the second URL request and running a second predefined function to obtain and store logon information of a service of the application service website.

3. The method according to claim 2, further comprising:

requesting to visit the application service website or a website associated with the application service website again, allowing logging on to the application service website or logging on to the website associated with the application service website according to locally stored logon information of the service.

4. The method according to claim 1, wherein before the receiving the first URL request sent from the application service website, the method further comprises:

performing authentication, and in response to the authentication being passed, obtaining and storing the logon information of the account of the application service website.

5. The method according to claim 2, wherein the first predefined function and the second predefined function are at least a script function.

6. The method according to claim 2, wherein before the receiving the first URL request sent from the application service website, the method further comprises:
performing authentication, and in response to the authentication being passed, obtaining and storing the logon information of the account of the application service website.

7. The method according to claim 3, wherein before the receiving the first URL request sent from the application service website, the method further comprises:
performing authentication, and in response to the authentication being passed, obtaining and storing the logon information of the account of the application service website.

8. The method according to claim 3, wherein the first predefined function and the second predefined function are at least a script function.

9. An apparatus for realizing logon to an application service website using an application operating platform running on an operating system of a user terminal, the apparatus comprising:
memory;
one or more processors; and
one or more programs stored in the memory and configured for execution by the one or more processors, the one or more programs comprising instructions to:
send a request to visit the application service website;
in response to the request, receive a first URL request sent from the application service website, which inquires whether there is logon information in the operation application platform, wherein the logon information is required to log on to the application service website;
obtain the logon information of an account of the application service website locally from the user terminal, in response to determining that the logon information of the account of the application service website is stored locally on the user terminal;
return the logon information of the account to the application service website by invoking a first predefined function and transmit the logon information of the account as a parameter of the first predefined function to the application service website; and
receive, in response to the transmission of the logon information, a web page for fast logon to the application service website from the application service website, the web page comprising of an object for triggering the fast logon, and wherein the fast logon is performed without inputting the logon information.

10. The apparatus according to claim 9, wherein the one or more programs further comprise instructions to:
receive a second URL request sent by the application service website after a fast logon operation is triggered on the web page; and
parse the second URL request and run a second predefined function to obtain and store logon information of a service of the application service website.

11. The apparatus according to claim 10, wherein the one or more programs further comprise instructions to:
request to visit the application service website or a website associated with the application service website is visited again,
allow logging on to the application service website or logging on to the website associated with the application service website according to locally stored logon information of the service.

12. The apparatus according to claim 9, wherein the one or more programs further comprise instructions to:
perform authentication, and in response to the authentication being passed, obtain and store the logon information of the account of the application service website.

13. The apparatus according to claim 10, wherein the one or more programs further comprise instructions to:
perform authentication, and in response to the authentication being passed, obtain and store the logon information of the account of the application service website.

14. The apparatus according to claim 11, wherein the one or more programs further comprise instructions to:
perform authentication, and in response to the authentication being passed, obtain and store the logon information of the account of the application service website.

15. An operation application platform for realizing logon to an application service website, comprising an apparatus, wherein the apparatus comprises:
memory;
one or more processors; and
one or more programs stored in the memory and configured for execution by the one or more processors, the one or more programs comprising instructions to:
send a request to visit the application service website;
in response to the request, receive a first URL request sent from the application service website, which inquires whether there is logon information in the operation application platform, wherein the logon information is required to log on to the application service website;
obtain the logon information of an account of the application service website locally from the user terminal, in response to determining that the logon information of the account of the application service website is stored locally on the user terminal;
return the logon information of the account to the application service website by invoking a first predefined function and transmit the logon information of the account as a parameter of the first predefined function to the application service website; and
receive, in response to the transmission of the logon information, a web page for fast logon to the application service website from the application service website, the web page comprising of an object for triggering the fast logon, and wherein the fast logon is performed without inputting the logon information.

* * * * *